May 29, 1945.   P. V. HUNTER ET AL   2,377,153
ELECTRIC CABLE
Filed June 6, 1942

PHILIP V. HUNTER,
HAROLD J. ALLCOCK &
RONALD McL. FAIRFIELD
INVENTORS
by their attorneys
Stebbins and Blenko Patented May 29, 1945

2,377,153

UNITED STATES PATENT OFFICE 2,377,153

ELECTRIC CABLE

Philip Vassar Hunter, London, Harold John Allcock, Belvedere, and Ronald McLeod Fairfield, Leigh, England, assignors to Callender's Cable & Construction Company Limited, London, England, a British company Application June 6, 1942, Serial No. 446,006
In Great Britain July 19, 1941

6 Claims. (Cl. 174—119)

It is well recognised that in electric cables for high voltages it is important that the construction of the dielectric should be such that it does not contain initially, or acquire subsequently, in transport, handling or service, a space or spaces within or in contact with it, which is or are filled with gas at low or normal atmospheric pressure. The present invention provides for the attainment of such a construction in a dielectric formed from a thermoplastic body consisting wholly or mainly of the normally solid polymers of ethylene. In accordance with the invention, the dielectric material, which is as homogeneous as possible, is applied, preferably by extrusion, over and in close contact with, and preferably with adhesion to, a smooth tube of a non-metallic plastic material loaded to render it electrically conductive. This tube surrounds the conductor with a clearance.

Figure 1:
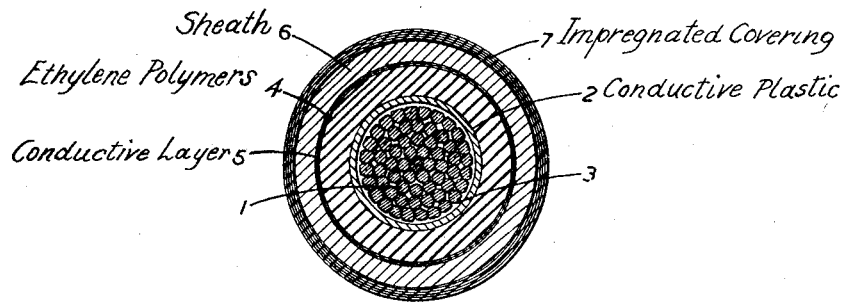
Figure 2:
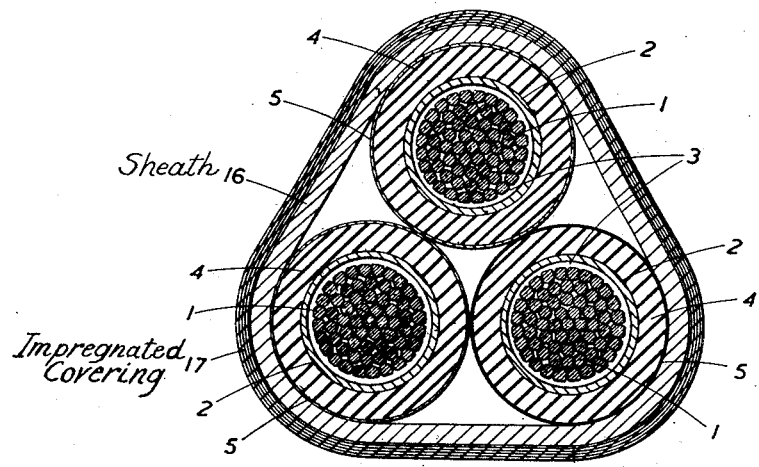

The invention will now be more fully described with occasional reference to the accompanying drawing which shows, by way of example, two forms of cable constructed in accordance with the invention, Figure 1 being a cross-section of a single core cable and Figure 2 a cross-section of a three core cable.

The conductor 1 of the single core cable and the three conductors 1 of the multi-core cable are each surrounded by a tube 2 of conductively loaded, non-metallic plastic material. A clearance 3 is left between each conductor 1 and its conductive tube 2. Surrounding each tube 2 and in close contact therewith is a layer of dielectric 4 consisting wholly or mainly of the normally solid polymers of ethylene.

As above indicated the dielectric material 4 may consist of polymerised ethylene alone, or it may be this material compounded with other thermo-plastic material which increases its flexibility while leaving the high standard of its dielectric properties unimpaired. Such additional material will constitute a minor part of the composition. An example of a suitable material is polyisobutylene.

When choosing a material for the conductive tube 2, consideration must be given to certain physical properties of the material with a view to the maintenance under working conditions of the cable of close contact between the tube and the surrounding dielectric 4. The physical properties of the material to which consideration must be given are those which affect the possibility of relative movement between the tube and the dielectric, namely, the co-efficient of thermal expansion, the modulus of elasticity and the power of adhesion to the dielectric material. These properties should be such that the tendency for relative displacement between the conductive tube and the dielectric are small and insufficient to destroy the close contact between them.

The clearance 3 between the conductor 1 and the inner surface of the conductive tube 2 is such that the conductor is always free within the tube when the maximum increase of temperature, to which the conductor may be liable in service, has caused it to expand. Such an increase in temperature of the conductor, as is well known, may not always be accompanied by an equivalent increase of temperature in the surrounding material with the result that a temperature difference will exist between the conductor 1 and the tube 2. The clearance will, therefore, be fixed on the assumption that with the maximum temperature difference between conductor 1 and tube 2 which is likely to be experienced, the conductor will still have external dimensions, e. g. an external diameter, measurably less than the corresponding internal dimensions, e. g. the internal diameter, of the tube. For instance, the normal internal diameter of the tube 2 may be made equal to the external diameter of the conductor 1 at its maximum working temperature plus 2 or 3 mils (0.05 or 0.075 mm.); from this it will be appreciated that the clearance 3 is exaggerated in the drawing. The conductor 1 will usually be of stranded construction, as shown in the drawing, and the external diameter will, of course, be measured at the maximum. The provision of the clearance 3 will ensure that the tube is not influenced in its shape, at least on its external surface, by the stranded form of the conductor so that it may remain truly smooth there and in practically perfect contact with the dielectric. The stranded conductor may have the surface of the outer layer of wires smoothed somewhat, for instance, by drawing the completed strand through a die so as to reduce its diameter and compensate to some extent for the addition to the cable size caused by the presence of the conducting tube 2 and the clearance 3.

Owing to the considerable difference between the co-efficient of thermal expansion of the conductor, generally copper, and those of the materials used for the conductive tube 2 and the dielectric 4 applied thereon, appreciable endwise movement of the conductor within its conductive tube will generally take place with temperature variation between the conductor and the surrounding material. To facilitate this movement and reduce any tendency to wrinkle or otherwise disturb the outer surface of the tube the conductor may be provided with a layer of lubricant. For this purpose graphite is preferred because it is an electrical conductor and improves the electrical connection between the metallic conductor 1 and the surrounding conducting tube 2. This layer is omitted from the drawing in order that the clearance 3 may be shown the more clearly.

The conductive tube 2 is formed of a plastic material in which is embodied a conducting powder, for instance carbon or finely divided metal. The plastic material may be thermo-plastic and may be the same as, or similar to, the material which forms the dielectric. Alternatively thermo-setting plastics may be used such as rubber compositions (which term includes both natural rubber compositions and synthetic rubber compositions and rubber substitute compositions, for instance, neoprene compositions), which contain a high proportion of carbon black or finely divided metal and have a high degree of elasticity. The latter characteristic may assist in providing free movement of the conductor. In all cases, however, the conducting tube must be of sufficiently low resistance to prevent ionisation and discharge in any of the spaces which will be present between its inner surface and the conductor. The maximum safe value of specific resistance of the material of the conducting tube can readily be calculated for a given cable by assuming dimensions for the largest space likely to occur in practice. In general it appears that material having a specific resistance less than 500 ohms/cm.$^3$ should be satisfactory.

The dielectric 4 will have on its outer surface a conductive layer 5 which may be a layer of the same material as is used for the conducting tube carrying the dielectric or may be a layer of metal tape or of metallised paper tape or a wrapping of metallised paper tape and an overlying wrapping of woven tape of which the warp threads or some of them are of copper wire. In the single core cable, the conductive layer 5 will usually be closely surrounded by an impervious sheath 6, primarily for mechanical protection. A lead sheath will generally be most satisfactory. When the cable is built up as a multi-core cable the cores, each produced in the manner above described, are assembled with or without fillers for the interspaces and enclosed in a common impervious sheath 16. Preferably the impervious sheaths 6, 16, are respectively enclosed in protective coverings 7 and 17. The protective covering may consist of tapes of paper and of fabric, impregnated with preservative compounds.

The conducting tube 2, whether of a rubber composition or of thermo-plastic material, is preferably applied by extrusion in a known manner, so as to have the required clearance over the conductor 1. The dielectric 4 is then applied, preferably by extrusion, so as to be a tight fit on the tube 2. The dielectric material should be extruded at as low a temperature as possible to minimise contraction and the formation of voids throughout the mass, which are especially prone to occur adjacent the conductor due to the fact that cooling proceeds from the outside, where solidification first occurs. On this account it may be advantageous to apply the dielectric 4 in a number of layers each of approximately 50 to 100 mils thick, each layer being made a tight fit on the underlying layer which is cold and free from all trace of surface contamination at the time of application of the overlying layer. In this way cooling of the dielectric can be made to take place largely from the inside and the production of contraction cavities be reduced to a marked extent. As a further precaution to obtain a perfectly homogeneous dielectric body, the barrel and head of the extrusion machine may be maintained under vacuum so as to prevent occlusion of air in the mass being extruded.

What we claim as our invention is:

1. In an insulated electric cable comprising a stranded conductor with a dielectric consisting at least mainly of normally solid polymers of ethylene, a smooth tube disposed between the conductor and the dielectric and lying in close contact with the dielectric, said tube consisting at least mainly of a non-metallic plastic material and a conducting powder and surrounding the conductor with a clearance sufficient to ensure that under all working conditions of the cable the external dimensions of the conductor are less than the corresponding internal dimensions of the tube, the space within the tube being substantially at atmospheric pressure.

2. In an insulated electric cable comprising a stranded conductor and a dielectric consisting at least mainly of normally solid polymers of ethylene, a smooth tube disposed between the conductor and the dielectric and lying in close contact with the dielectric, said tube consisting at least mainly of normally solid polymers of ethylene and a conducting powder and surrounding the conductor with a clearance sufficient to ensure that under all working conditions of the cable the external dimensions of the conductor are less than the corresponding internal dimensions of the tube, the space within the tube being substantially at atmospheric pressure.

3. In an insulated electric cable comprising a stranded conductor and a dielectric consisting at least mainly of normally solid polymers of ethylene, a smooth tube disposed between the conductor and the dielectric and lying in close contact with the dielectric, said tube consisting of a conductive rubber composition having a high degree of elasticity and surrounding the conductor with a clearance sufficient to ensure that under all working conditions of the cable the external dimensions of the conductor are less than the corresponding internal dimensions of the said tube, the space within the tube being substantially at atmospheric pressure.

4. A method of making an insulated electric cable which comprises applying a tube consisting of a non-metallic, plastic material and a conducting powder to a conductor with a clearance of which the magnitude is such that it is of measurable dimensions under all working conditions of the cable, and thereafter applying a number of layers of dielectric material each consisting at least mainly of normally solid polymers of ethylene and each being approximately from 50 to 100 mils thick and having a tight fit on the underlying layer of material which is cold and free from surface moisture at the time of application of the overlying layer.

5. An insulated electric cable comprising a conductor, a tube of conductively loaded non-metallic plastic material surrounding the conductor with a clearance of which the magnitude is such that it is of measurable dimensions under all working conditions of the cable, and a laminated dielectric each layer of which consists at least mainly of normally solid polymers of ethylene, is from about 50 to 100 mils thick and is shrunk on the underlying layer.

6. A method of making an insulated electric cable which comprises applying by extrusion a tube consisting of non-metallic plastic material and a conducting powder to a conductor with a clearance of which the magnitude is such that it is of measurable dimensions under all working conditions of the cable, allowing said tube to become cold, thereafter applying by extrusion on the cold tube a tightly fitting layer of dielectric material consisting at least mainly of normally solid polymers of ethylene and being approximately from 50 to 100 mils thick, allowing said layer of dielectric material to become cold and thereafter applying by extrusion on said cold layer a second and tightly fitting layer of dielectric material consisting at least mainly of normally solid polymers of ethylene and being approximately from 50 to 100 mils thick.

PHILIP VASSAR HUNTER.
HAROLD JOHN ALLCOCK.
RONALD McLEOD FAIRFIELD.